United States Patent
Cho et al.

(10) Patent No.: US 9,242,674 B2
(45) Date of Patent: Jan. 26, 2016

(54) REAR VEHICLE BODY REINFORCING STRUCTURE

(71) Applicant: Hyundai Motor Company, Seoul (KR)

(72) Inventors: Sung Hoon Cho, Bucheon-si (KR); Yong Dok An, Anyang-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/448,428

(22) Filed: Jul. 31, 2014

(65) Prior Publication Data
US 2015/0166122 A1    Jun. 18, 2015

(30) Foreign Application Priority Data
Dec. 17, 2013   (KR) .................. 10-2013-0157537

(51) Int. Cl.
| *B62D 25/02* | (2006.01) |
| *B62D 25/16* | (2006.01) |
| *B62D 25/20* | (2006.01) |
| *B62D 25/06* | (2006.01) |

(52) U.S. Cl.
CPC ............ *B62D 25/02* (2013.01); *B62D 25/2036* (2013.01); *B62D 25/06* (2013.01)

(58) Field of Classification Search
CPC .... B62D 25/02; B62D 25/08; B62D 25/2009; B62D 25/2027; B62D 25/2036; B62D 27/02; B62D 27/023

USPC ............ 296/187.03, 187.11, 187.12, 187.13, 296/193.05, 198, 203.03, 203.04
See application file for complete search history.

(56) References Cited

U.S. PATENT DOCUMENTS

| 7,866,738 | B2* | 1/2011 | Andou et al. ................. 296/198 |
| 8,011,719 | B2* | 9/2011 | Walter et al. ............. 296/203.04 |
| 2004/0174048 | A1* | 9/2004 | Vincenti .................. 296/203.04 |
| 2011/0156447 | A1* | 6/2011 | Matsuoka et al. ....... 296/203.04 |
| 2011/0278880 | A1* | 11/2011 | Tsuyuzaki et al. ........ 296/187.11 |
| 2013/0049407 | A1* | 2/2013 | Kageyama ..................... 296/204 |
| 2013/0049408 | A1* | 2/2013 | Kurogi et al. .................. 296/209 |
| 2013/0341970 | A1* | 12/2013 | Shimizu et al. .......... 296/193.08 |
| 2014/0021748 | A1* | 1/2014 | Park et al. ................ 296/203.04 |
| 2015/0054309 | A1* | 2/2015 | Kuenkler et al. ......... 296/187.11 |

FOREIGN PATENT DOCUMENTS

JP     2011-131796 A     7/2011

* cited by examiner

*Primary Examiner* — Jason S Daniels
(74) *Attorney, Agent, or Firm* — Morgan, Lewis & Bockius LLP

(57) ABSTRACT

A structure for reinforcing a rear vehicle body may include a roof side rail extending in the longitudinal direction of a vehicle and forming the roof of the vehicle which is overlapped and coupled to a quarter panel extending rearward in the longitudinal direction of the vehicle and coupled to the upper portions of a rear pillar, a rear wheel housing, and a rear combination, and the rear end of the roof side rail in the longitudinal direction of the vehicle is extended and coupled to the rear end of the quarter panel in the longitudinal direction of the vehicle.

5 Claims, 3 Drawing Sheets

REAR VEHICLE BODY REINFORCING STRUCTURE

CROSS-REFERENCE TO RELATED APPLICATION

The present application claims priority to Korean Patent Application No. 10-2013-0157537 filed Dec. 17, 2013, the entire contents of which is incorporated herein for all purposes by this reference.

BACKGROUND OF THE INVENTION

1. Field of the Invention

The present invention relates to a structure for reinforcing a rear vehicle body. More particularly, the present invention relates to a structure for reinforcing a rear vehicle body which may have improved collision performance, distortion strength, riding comfort, and steering stability by using a multi-ring structure.

2. Description of Related Art

In general, the rear vehicle bodies of vehicles may include a real floor panel that forms the bottoms of the passenger room and the trunk room by elongating in the longitudinal direction of the vehicles, and a rear pillar, a rear wheel housing, and a rear combination are sequentially arranged to the rear in the longitudinal direction the vehicles, at both sides of the rear floor panel in the width direction of the vehicles.

A back panel cross member and a transverse member that are elongated in the width direction of the vehicles are arranged above a spare tire rear well at the rear in the longitudinal direction of the vehicles to increase the width-directional strength of the vehicles.

Further, a quarter panel is disposed above the rear pillar and the rear wheel housing and a roof side rail forming the roof of the vehicles is disposed ahead of the quarter panel in the longitudinal direction of the vehicles.

However, in the structures of the rear vehicle bodies, the roof side rail and the quarter upper panel are not connected and the rear combination and the quarter upper panel are also not connected, that is, several parts of the rear vehicle bodies are not firmly connected, such that the connection strength and distortion strength of the rear vehicle bodies are low, the riding comfort and steering stability are decreased, and it is difficult to effectively cope with a rear collision.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for reinforcing a rear vehicle body having advantageous of being configured to keep passengers more safe by effectively distributing and absorbing shock energy in a rear collision, improve riding comfort and steering stability of a vehicle by increasing the connection strength and distortion strength of the rear vehicle body, and improve driving stability of the vehicle body by increasing the vehicle body input point strength of the rear suspension in a wheel housing, by using a multi-ring structure so that several parts of the rear vehicle body are integrally connected.

In an aspect of the present invention, a structure for reinforcing a rear vehicle body may include a roof side rail extending in the longitudinal direction of a vehicle and forming a roof of the vehicle which may be overlapped and coupled to a quarter panel extending rearward in the longitudinal direction of the vehicle and coupled to the upper portions of a rear pillar, a rear wheel housing, and a rear combination, wherein a rear end of the roof side rail in the longitudinal direction of the vehicle is extended and coupled to a rear end of the quarter panel in the longitudinal direction of the vehicle.

The structure for reinforcing a rear vehicle body may further include a first connecting portion where the rear end of the roof side rail and the rear end of the quarter panel are coupled, where at the first connecting portion, an upper end of a rear wheel housing reinforcing member may be coupled by a first connection bracket and a lower end of the rear wheel housing reinforcing bracket in a height direction of the vehicle may be coupled to the rear wheel housing to reinforce the rear wheel housing.

The lower end of a rear reinforcing member in the height direction of the vehicle may be coupled to the rear end in the longitudinal direction of the rear side member extending in the longitudinal direction of the vehicle, and the upper end of the rear reinforcing member in the height direction of the vehicle may be coupled to the first connection bracket.

The structure for reinforcing a rear vehicle body may further include a second connection portion where lower end of the rear reinforcing member may be coupled to the rear end of the rear side member by a second connection bracket, and one end of a back panel cross member extending in the width direction of the vehicle may be coupled to the second connection bracket, such that the second connecting portion may be formed.

The lower end of the rear reinforcing member in the height direction of the vehicle may be coupled to a transverse member extending in the width direction of the vehicle.

The first connecting portion may be coupled to the rear combination.

The rear side members may be coupled to the left and right sides in the width direction of the vehicle of a rear floor panel that extends in the longitudinal direction of the vehicle and forms the floor of the interior and the trunk room of the vehicle, spare tire wells that form a space for a spare tire may be formed at the rear floor panel, the rear pillar may vertically extend in the height direction of the vehicle and is coupled to the rear side member, the rear wheel housing may be coupled to the rear pillar, and the rear combination may be coupled to the rear wheel housing.

A first ring structure may be formed by connecting the rear pillar and the roof side rail, a second ring structure may be formed by connecting an upper portion of the quarter panel and the roof side rail, a third ring structure connecting the rear wheel housing, the wheel housing reinforcing member, and the quarter panel may be formed, a fourth ring structure connecting the rear side member with the rear reinforcing member and the rear combination with the wheel housing reinforcing member may be formed, a fifth ring structure connecting the spare tire wells may be formed, a sixth ring structure connecting the back panel cross member, the rear reinforcing member, and the transverse member may be formed, and a seventh ring structure connecting the transverse member, the rear reinforcing member, and a rear upper vehicle body may be formed.

According to the structure for reinforcing a rear vehicle body of an aspect of the present invention, the rear end of the rear roof side rail in the longitudinal direction of a vehicle extends to the rear end of the quarter inner upper member in the longitudinal direction of the vehicle, the rear end of the rear roof side rail, the rear end of the quarter inner upper member, and the front end of the rear combination are integrally connected, the rear end of the quarter inner upper member and the front end of the rear combination are integrally connected, and the lower end of the rear reinforcing member is integrally connected with the rear side member, the back panel cross member, and the transverse member, such that a multi-ring structure is formed. Accordingly, the up-down and left-right connection strength and distortion strength of the rear vehicle body are effectively increased.

Accordingly, shock energy applied to the rear vehicle body in a rear collision of a vehicle is effectively distributed and absorbed by the parts of the rear vehicle body, such that it is possible to keep passengers more safe and stabilize the vehicle body of the vehicle in motion. Accordingly, it is possible to improve steering stability and driving stability.

Further, the input point strength of a rear suspension system in a wheel housing is increased, such that the rear suspension system stably supports the vehicle body and the riding comfort can be improved.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that may have two or more sources of power, for example both gasoline-powered and electric-powered vehicles.

The methods and apparatuses of the present invention may have other features and advantages which will be apparent from or are set forth in more detail in the accompanying drawings, which are incorporated herein, and the following Detailed Description, which together serve to explain certain principles of the present invention.

Figure 1:
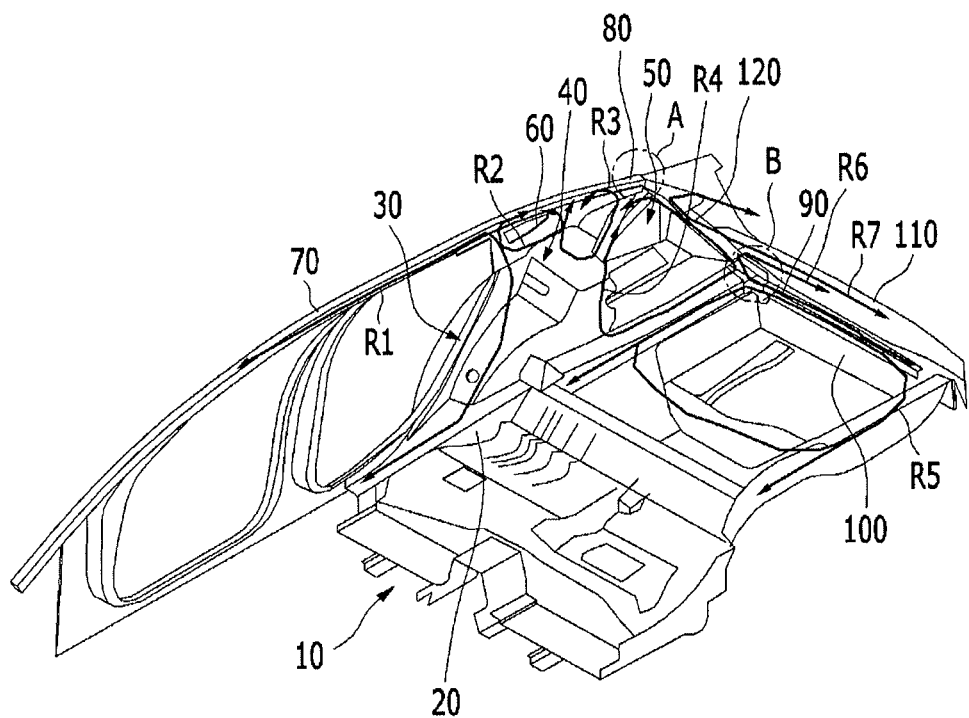
FIG. 1 is a perspective view showing a structure for reinforcing a rear vehicle body according to an aspect of the present invention.

Reference numerals set forth in the Drawings may include reference to the following elements as further discussed below It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be may include d within the spirit and scope of the invention as defined by the appended claims.

Hereinafter, exemplary embodiments of the present invention will be described in detail with reference to the accompanying drawings so that those skilled in the Field of the Invention to which the present invention pertains may carry out the exemplary embodiments.

Referring to FIG. 1, a rear vehicle body structure may include a rear floor panel 10 that extends in the longitudinal direction of a vehicle and forms the bottom of a rear floor and a trunk room.

Rear side members 20 extending in the longitudinal direction of the vehicle are attached to both sides of the rear floor panel 10 in the width direction of the vehicle.

A rear pillar 30, a rear wheel housing 40, and a rear combination 50 are attached to the rear side member 20 sequentially at the rear of the vehicle.

A quarter panel 60 extending in the longitudinal direction of the vehicle is attached to the upper portions of the rear pillar 30, the rear wheel housing 40, and the rear combination 50.

A roof side rail 70 that forms the roof of the vehicle extends in the longitudinal direction of the vehicle and a rear end of the roof side rail 70 extends to almost fit the rear end of the quarter panel 60 in the longitudinal direction of the vehicle and is coupled thereto.

That is, the roof side rail 70 extends rearward in the longitudinal direction of the vehicle together with the quarter panel 60 without disconnecting from the quarter panel 60.

Further, one end of a wheel housing reinforcing member 80 is connected to a side of the wheel housing 40 and the other end is integrally coupled to a first connecting portion A to which the rear end of the roof side rail 70 and the rear end of the quarter panel 60 are connected, in order to reinforce the support strength of the rear wheel housing 40. The first connecting portion is coupled to the rear combination.

A back panel cross member 90 extending in the width direction of the vehicle is integrally connected to the rear end of the rear side member 20 in the longitudinal direction of the vehicle and a transverse member 110 extending in the width direction of the vehicle is coupled to a spare tire rear well 100.

A lower end of a rear reinforcing member 120, which is added in accordance with an aspect of the present invention, is integrally coupled to a second connecting portion B to which the rear end of the rear side member 20 and one end of the back panel cross member 90 are connected, and the upper end of the rear reinforcing member 120 extends outside in the width direction of the vehicle and in the height direction of the vehicle and is integrally coupled to the first connecting portion A.

Therefore, according to the structure for reinforcing a rear vehicle body of an aspect of the present invention, a multi-ring structure having a closed-loop structure is formed, such that the connection strength and distortion strength of the rear vehicle body are effectively increased.

That is, a first ring structure R1 may be formed by connecting the rear pillar 30 and the roof side rail 70, a second ring structure R2 may be formed by connecting the upper portion of the quarter panel 60 and the roof side rail 70, and a third ring structure R3 connecting the wheel housing 40, the wheel housing reinforcing member 80, and the quarter panel 60 may be formed.

Further, a fourth ring structure R4 connecting the rear side member 20 with the rear reinforcing member 120 and the rear combination 50 with the wheel housing reinforcing member 80 may be formed, a fifth ring structure R5 connecting the spare tire front well, rear well, and left and right wells may be formed, a sixth ring structure R6 connecting the back panel cross member 90, the rear reinforcing member 120, and the transverse member 110 may be formed, and a seventh ring structure R7 connecting the transverse member 110, the rear reinforcing member 120, and the rear upper vehicle body may be formed.

Further, as shown in the figures, the adjacent ring structures are connected.

As described above, when the multi-ring structure without disconnection is used, the connection strength and distortion strength of the rear vehicle body are effectively increased, shock energy transmitted to the ring structures is distributed and absorbed by them, and the shock energy that is not absorbed by the ring structures is distributed and absorbed by other ring structures, such that the performance of distributing and absorbing shock energy is effectively improved.

Figure 2:
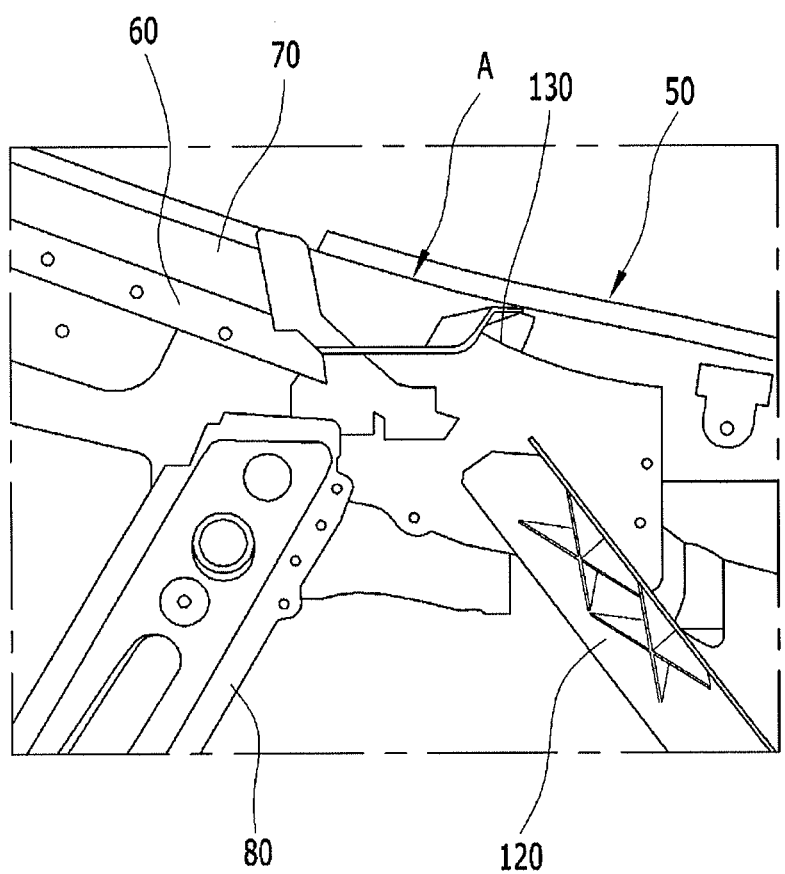
FIG. 2 is a view showing an upper connecting portion of a rear reinforcing member according to an aspect of the present invention.

Referring to FIG. 2, at the first connecting portion A, the rear end of the roof side rail 70 is extended and coupled to the rear end of the quarter panel 60 outside the vehicle in the width direction, and at the joint, the upper end of the wheel housing reinforcing member 80 and the upper end of the rear reinforcing member 120 are coupled by attaching a first connection bracket 130.

Accordingly, the roof side rail 70, quarter panel 60, rear combination 50, rear reinforcing member 120, and wheel housing reinforcing member 80 are integrally connected by the first connection bracket 130.

Figure 3:
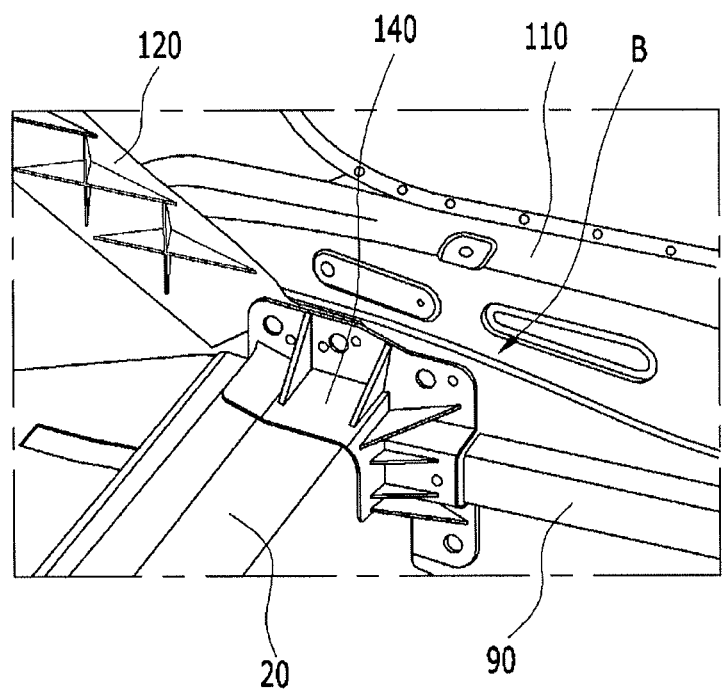
FIG. 3 is a view showing a lower connecting portion of the rear reinforcing member according to an aspect of the present invention.

Referring to FIG. 3, at the second connecting portion B, a second connection bracket 140 is coupled to the rear end of the rear side member 20, one end of the back panel cross member 90 and the lower end of the rear reinforcing member 120 are coupled by the second connection bracket 140, and the lower end of the rear reinforcing member 120 overlaps the transverse member 110.

Accordingly, the rear side member 20, back panel cross member 90, rear reinforcing member 120, and transverse member 110 can be connected by the second connection bracket 140.

The members may be coupled by welding or bolting.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention may have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for reinforcing a rear vehicle body, including
 a roof side rail extending in a longitudinal direction of a vehicle and forming a roof of the vehicle which is overlapped and coupled to a quarter panel extending rearward in the longitudinal direction of the vehicle and coupled to upper portions of a rear pillar and a rear wheel housing;
 a first connecting portion where a rear end of the roof side rail and a rear end of the quarter panel are coupled, wherein at the first connecting portion, an upper end of a rear wheel housing reinforcing member is coupled by a first connection bracket and a lower end of the rear wheel housing reinforcing member in a height direction of the vehicle is coupled to the rear wheel housing to reinforce the rear wheel housing,
 wherein the rear end of the roof side rail in the longitudinal direction of the vehicle is extended and coupled to the rear end of the quarter panel in the longitudinal direction of the vehicle, and
 wherein a lower end of a rear reinforcing member in the height direction of the vehicle is coupled to a rear end in a longitudinal direction of a rear side member extending in the longitudinal direction of the vehicle, and an upper end of the rear reinforcing member in the height direction of the vehicle is coupled to the first connection bracket.

2. The structure of claim 1, further including
 a second connection portion, wherein the lower end of the rear reinforcing member is coupled to the rear end of the rear side member by a second connection bracket, and one end of a back panel cross member extending in a width direction of the vehicle is coupled to the second connection bracket, such that the second connecting portion is formed.

3. The structure of claim 2, wherein the lower end of the rear reinforcing member in the height direction of the vehicle is coupled to a transverse member extending in the width direction of the vehicle.

4. The structure of claim 3, wherein
 the rear side member is coupled to a left or right side in the width direction of the vehicle of a rear floor panel that extends in the longitudinal direction of the vehicle and forms a floor of an interior and a trunk room of the vehicle,
 spare tire wells that form a space for a spare tire are formed at the rear floor panel,
 the rear pillar vertically extends in the height direction of the vehicle and is coupled to the rear side member, and
 the rear wheel housing is coupled to the rear pillar.

5. The structure of claim 4, wherein
 a first ring structure is formed by connecting the rear pillar and the roof side rail,
 a second ring structure is formed by connecting an upper portion of the quarter panel and the roof side rail,
 a third ring structure connecting the rear wheel housing, the wheel housing reinforcing member, and the quarter panel is formed,
 a fourth ring structure connecting the rear side member with the rear reinforcing member and the wheel housing reinforcing member is formed,
 a fifth ring structure connecting the spare tire wells is formed, a sixth ring structure connecting the back panel cross member, the rear reinforcing member, and the transverse member is formed, and a seventh ring structure connecting the transverse member, the rear reinforcing member, and a rear upper vehicle body is formed.

* * * * *